(12) United States Patent
Arima

(10) Patent No.: US 6,978,072 B2
(45) Date of Patent: Dec. 20, 2005

(54) RARE-EARTH DOPED OPTICAL FIBER MODULE AND MANUFACTURING METHOD THEREFOR

(75) Inventor: Tadao Arima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/928,854

(22) Filed: Aug. 27, 2004

(65) Prior Publication Data

US 2005/0031286 A1 Feb. 10, 2005

Related U.S. Application Data

(63) Continuation of application No. PCT/JP02/03929, filed on Apr. 19, 2002.

(51) Int. Cl.$^7$ ............................... G02B 6/00
(52) U.S. Cl. ............... 385/135; 385/134; 385/137; 242/570
(58) Field of Search ............... 385/134, 136, 385/137; 359/341.1; 252/570

(56) References Cited

U.S. PATENT DOCUMENTS

| | | | | |
|---|---|---|---|---|
| 5,703,990 A | * | 12/1997 | Robertson et al. | 385/135 |
| 6,038,362 A | * | 3/2000 | Toyoda et al. | 385/137 |
| 6,201,923 B1 | * | 3/2001 | Yuhara et al. | 385/137 |
| 6,546,180 B1 | * | 4/2003 | Koyano et al. | 385/135 |
| 2003/0059192 A1 | * | 3/2003 | Johnson | 385/135 |

FOREIGN PATENT DOCUMENTS

| JP | 52-4850 | 1/1977 | G02B 5/14 |
|---|---|---|---|
| JP | 03-121426 | 5/1991 | G02F 1/35 |
| JP | 07-183597 | 7/1995 | H01S 3/094 |
| JP | 08-000580 | 1/1996 | A61B 5/22 |
| JP | 08-005858 | 1/1996 | G02B 6/255 |
| JP | 09-055556 | 2/1997 | H01S 3/10 |
| JP | 10-132579 | 5/1998 | G01C 19/72 |
| JP | 10-239532 | 9/1998 | G02B 6/00 |
| JP | 11-295079 | 10/1999 | G01C 19/72 |
| JP | 2000-131079 | 5/2000 | G01C 19/72 |
| JP | 2001-111150 | 4/2001 | H01S 3/10 |
| JP | 2001-311833 | 9/2001 | G02B 6/00 |
| JP | 2001-326406 | 11/2001 | H01S 3/10 |

* cited by examiner

Primary Examiner—John D. Lee
Assistant Examiner—Daniel Petkovsek
(74) Attorney, Agent, or Firm—Katten Muchin Rosenman LLP

(57) ABSTRACT

A rare-earth doped optical fiber module including a resin reel having elasticity and a rare-earth doped optical fiber wound around the resin reel. The rare-earth doped optical fiber module further includes a single-mode optical fiber spliced to the rare-earth doped optical fiber and wound around the resin reel. The resin reel is formed of silicone rubber, fluororubber, or soft PVC.

3 Claims, 5 Drawing Sheets

RARE-EARTH DOPED OPTICAL FIBER MODULE AND MANUFACTURING METHOD THEREFOR

This is a continuation of International PCT Application No. PCT/JP02/03929, filed Apr. 19, 2002, which was not published in English.

BACKGROUND OF THE INVENTION

1. Field of the Invention

The present invention relates generally to a rare-earth doped optical fiber module and a manufacturing method therefor, and more particularly to an erbium-doped optical fiber (EDF) module and a manufacturing method therefor.

2. Description of the Related Art

An optical communication system using an optical amplifier for directly amplifying an optical signal has become general, and an EDF module is used as a basic component of such an optical amplifier having an optical amplifying function. FIG. 1 shows an EDF module 1 in the related art. As shown in FIG. 1, the EDF module 1 is configured by winding an Er doped optical fiber 4 around a metal reel 2. By adjusting the length of the Er doped optical fiber 4, the amplification characteristic is set to a required value. Further, normal single-mode optical fibers are spliced to the opposite ends of the Er doped optical fiber 4.

The spliced portion between the Er doped optical fiber 4 and each single-mode optical fiber is protected by dropping a UV curing resin to the spliced portion and directing UV radiation to the UV curing resin to cure the same. This process is referred to as recoating of the spliced portion. After protecting each spliced portion by this recoating process, the single-mode optical fibers are also wound around the reel for storage. In an EDF module for a wavelength division multiplexing (WDM) amplifier, uniform temperature control of an Er doped optical fiber is performed by utilizing heat conduction of a metal reel as measures against the temperature dependence of amplification characteristic.

The related art EDF module 1 using the metal reel 2 has such a problem that the loss due to stress generated in winding the Er doped optical fiber 4 is increased. Accordingly, the loss contributing to the amplification characteristic of the Er doped optical fiber 4 itself becomes unclear, so that the adjustment of high-precision amplification characteristic is impossible. Since the Er doped optical fiber 4 is kept wound around the metal reel 2, stress is always applied to the Er doped optical fiber 4, causing a reduction in reliability. While another metal reel whose diameter is adjustable is used, such a metal reel is complicated in structure and it is therefore costly.

FIGS. 2 and 3 show another EDF module 5 in the related art as applied to an EDF module which does not require temperature control. As shown in FIG. 2, an Er doped optical fiber 4 is wound around a metal reel 6. Thereafter, the Er doped optical fiber 4 is removed as a bundle from the metal reel 6. The metal reel 6 is formed with a plurality of bundling recesses 8. FIG. 3 shows the EDF module 5 removed from the metal reel 6. Reference numerals 10 denote spliced portions between the Er doped optical fiber 4 and single-mode optical fibers 12. Reference numerals 14 denote bundling tubes.

As shown in FIG. 3, the EDF module 5 is removed from the metal reel 6 for use, so that the stress always applied to the Er doped optical fiber 4 can be removed. However, it is necessary to use the metal reel 6 having such a special shape that it has the bundling recesses 8 for bundling the Er doped optical fiber 4 as shown in FIG. 2. Accordingly, there is a possibility that the coating of the Er doped optical fiber 4 may be deformed and/or damaged. Further, in adjusting the length of the Er doped optical fiber 4 or in splicing the single-mode optical fibers 12 to the opposite ends of the Er doped optical fiber 4, it is necessary to once remove the bundling tubes 14 and to bundle the Er doped optical fiber 4, so that the operation becomes troublesome. In the case that temperature control of the Er doped optical fiber 4 is necessary, the EDF module 5 shown in FIG. 3 must be stored into a container for temperature control.

SUMMARY OF THE INVENTION

It is therefore an object of the present invention to provide a rare-earth doped optical fiber module which can relieve the stress generated in winding a rare-earth doped optical fiber, thereby allowing high-precision adjustment of the amplification characteristic.

It is another object of the present invention to provide a manufacturing method for a rare-earth doped optical fiber module which can relieve the stress generated in winding a rare-earth doped optical fiber.

In accordance with an aspect of the present invention, there is provided a rare-earth doped optical fiber module including a resin reel having elasticity; and a rare-earth doped optical fiber wound around the resin reel.

Preferably, the resin reel is formed of silicone rubber, fluororubber, or soft PVC. Preferably, the rare-earth doped optical fiber module further includes a metal tape embedded in the resin reel so as to extend in the circumferential direction of the resin reel, the metal tape being fabricated by twisting metal wires into the form of a net. More preferably, a heater and a temperature sensor are mounted on the resin reel, and the heater is in contact with the metal tape.

In accordance with another aspect of the present invention, there is provided a manufacturing method for a rare-earth doped optical fiber module, including the steps of setting a resin reel having elasticity on a metal reel whose diameter is changeable between a first diameter and a second diameter larger than the first diameter; increasing the diameter of the metal reel to the second diameter to thereby increase the diameter of the resin reel; winding a rare-earth doped optical fiber around the resin reel; decreasing the diameter of the metal reel to the first diameter; and removing the resin reel having the rare-earth doped optical fiber from the metal reel.

Preferably, the manufacturing method further includes the step of splicing a single-mode optical fiber to the rare-earth doped optical fiber after decreasing the diameter of the metal reel to the first diameter and before removing the resin reel from the metal reel.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 4:
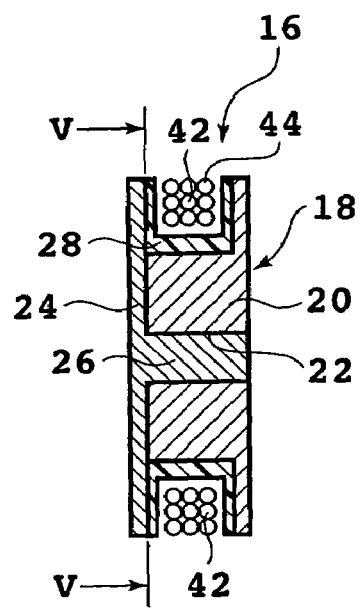
FIG. 4 is a sectional view of an EDF module according to a first preferred embodiment of the present invention in the condition where the EDF module is mounted on a metal reel.
Figure 5:
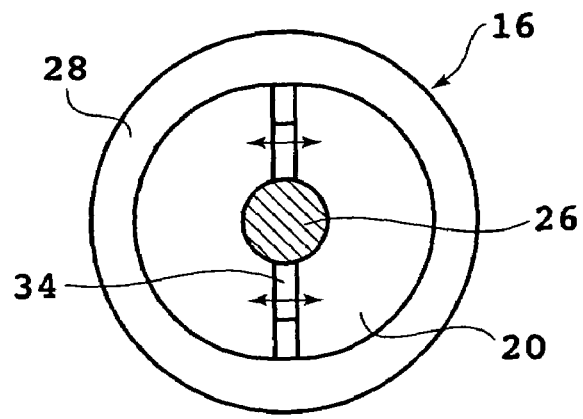
FIG. 5 is a cross section taken along the line V—V in FIG. 4.

Referring to FIG. 4, there is shown a sectional view of an EDF module 16 according to a first preferred embodiment of the present invention in the condition that the EDF module 16 is mounted on a metal reel 18. FIG. 5 is a cross section taken along the line V—V in FIG. 4. The metal reel 18 is composed of a first segment 20 having a center hole 22 and a second segment 24 having a shaft 26 inserted in the center hole 22 of the first segment 20. A resin reel 28 having elasticity is mounted on the metal reel 18. The resin reel 28 is formed of silicone rubber, fluororubber, or soft polyvinyl carbazole (PVC), for example. The resin reel 28 is fabricated by using a mold so that the outer diameter of the bottom of the resin reel 28 becomes 60 mm.

Figure 6:
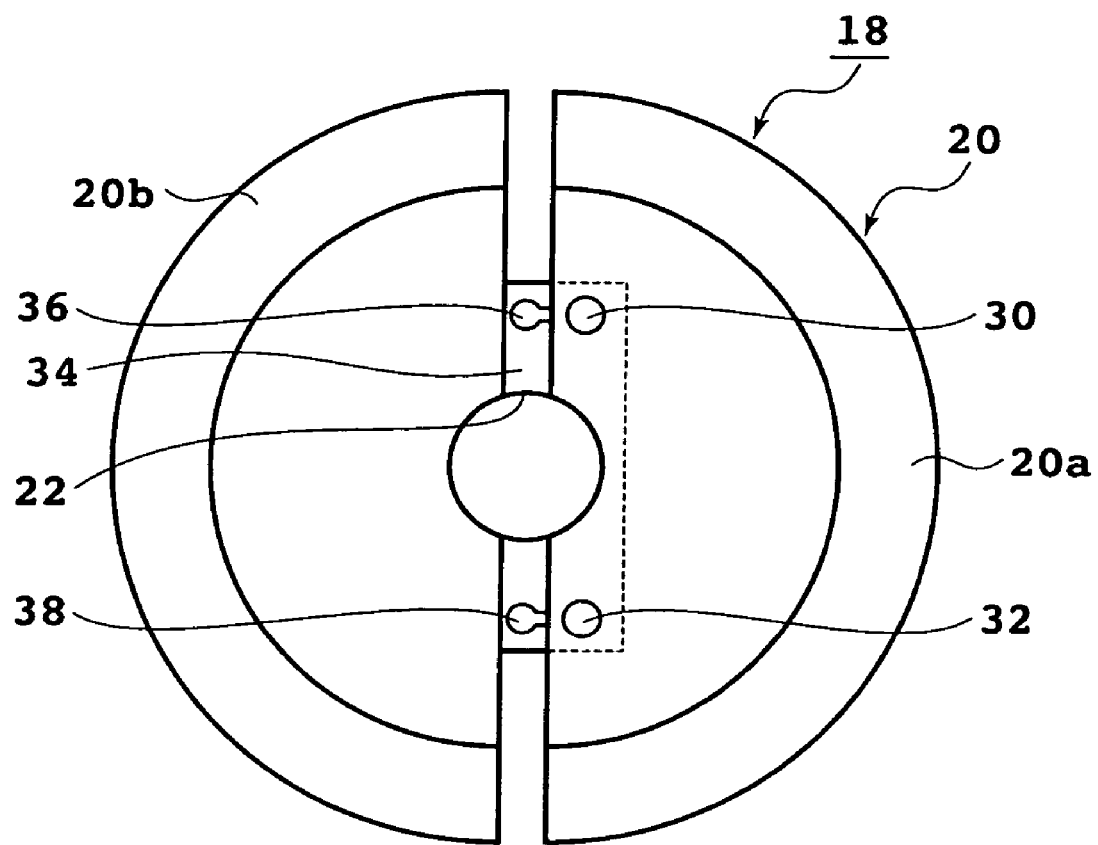
FIG. 6 is a side view of a first segment of the metal reel in the condition where the diameter of the metal reel is increased.

As shown in FIG. 6, the first segment 20 of the metal reel 18 is composed of a first semicircular reel 20a and a second semicircular reel 20b. A pair of pins 30 and 32 are fixed to the first semicircular reel 20a. The second semicircular reel 20b is connected to a bracket 34. The bracket 34 is formed with a pair of elongated holes 36 and 38. The pins 30 and 32 are inserted in the elongated holes 36 and 38, respectively. Accordingly, the second semicircular reel 20b is movable between a diameter decreased position where the second semicircular reel 20b is in contact with the first semicircular reel 20a and a diameter increased position where the second semicircular reel 20b is spaced apart from the first semicircular reel 20a by a predetermined distance as shown in FIG. 6.

Figure 7:
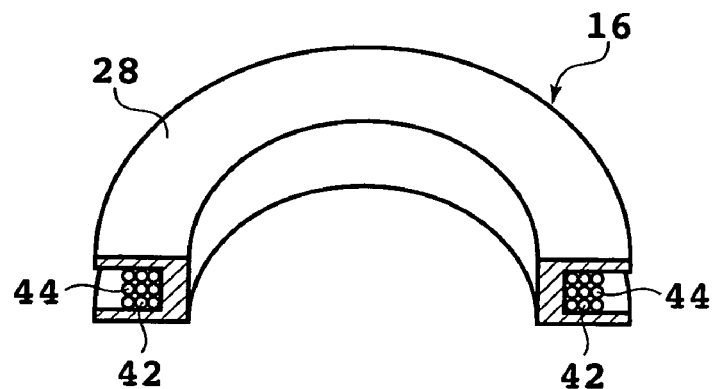
FIG. 7 is a partially cutaway, perspective view of the EDF module according to the first preferred embodiment.

After mounting the resin reel 28 on the metal reel 18, the outer diameter of the metal reel 18 is increased as shown in FIG. 6 so that the outer diameter of the bottom of the winding portion of the resin reel 28 is increased from 60 mm to 61 mm. In this condition, an Er doped optical fiber 42 is wound around the resin reel 28. Thereafter, the outer diameter of the metal reel 18 is reduced to restore the original outer diameter (=60 mm) of the bottom of the winding portion of the resin reel 28 and to adjust the length of the Er doped optical fiber 42, thereby setting the amplification characteristic to a target value. Thereafter, single-mode optical fibers 44 are spliced to the opposite ends of the Er doped optical fiber 42, and the spliced portions are recoated with a UV curing resin for reinforcement. Thereafter, the single-mode optical fibers 44 are wound around the resin reel 28 for storage. The second segment 24 of the metal reel 18 is removed from the first segment 20, and the resin reel 28 is next removed from the first segment 20 to obtain the EDF module 16 according to the first preferred embodiment shown in FIG. 7.

Figure 1:
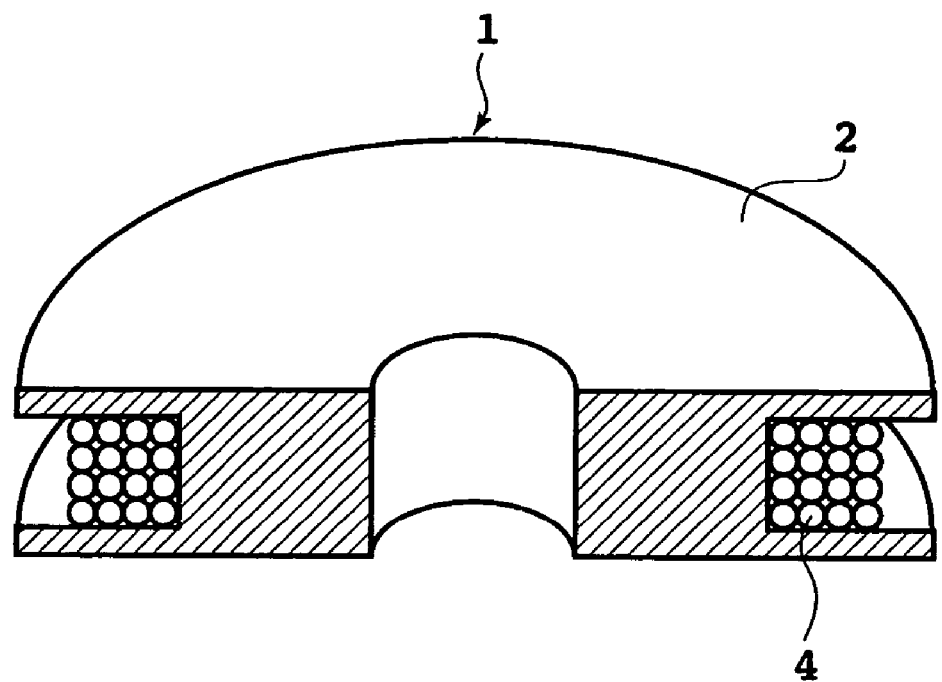
FIG. 1 is a partially cutaway, perspective view of an EDF module in the related art.
Figure 2:
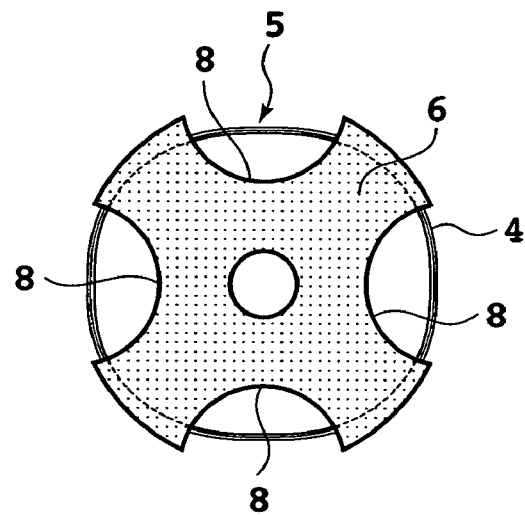
FIG. 2 is a side view of a metal reel for bundling an Er doped optical fiber in the related art.
Figure 3:
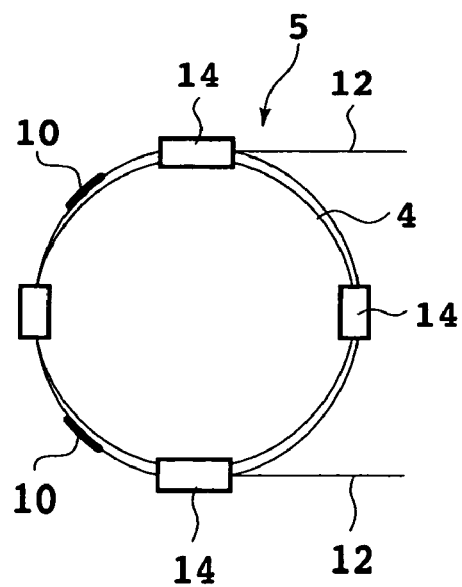
FIG. 3 is an elevational view of another EDF module in the related art obtained after bundling the Er doped optical fiber shown in FIG. 2.

In the conventional EDF module 1 shown in FIG. 1 wherein the Er doped optical fiber 4 is wound around the metal reel 2, a loss increase due to a winding stress to the Er doped optical fiber 4 is 0.5 to 1.5 dB. In contrast, the EDF module 16 according to the above preferred embodiment can obtain a stress-free condition, and the loss increase can be suppressed to 0.1 dB or less.

Figure 8:
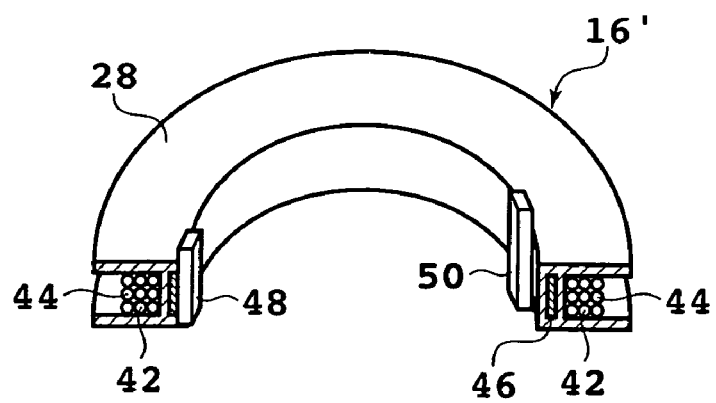
FIG. 8 is a partially cutaway, perspective view of an EDF module according to a second preferred embodiment of the present invention.

An EDF module for a WDM amplifier is required to suppress the influence of temperature characteristics. FIG. 8 shows an EDF module 16' according to a second preferred embodiment of the present invention which can perform temperature control. The EDF module 16' includes a metal tape 46 embedded in a resin reel 28 along the inner circumference thereof. The metal tape 46 is fabricated by twisting metal wires into the form of a net. The embedding of the metal tape 46 in the resin reel 28 may be performed in molding the resin reel 28. The metal tape 46 fabricated by twisting metal wires into the form of a net has elasticity, so that the elasticity of the resin reel 28 can be maintained.

The inner circumference of the resin reel 28 is partially removed to thereby expose a part of the metal tape 46. A sheetlike heater 48 is attached to the exposed portion of the metal tape 46. Further, a temperature sensor 50 such as a resistance thermometer is attached to another portion of the inner circumference of the resin reel 28. The temperature of the resin reel 28 is detected by the temperature sensor 50, and the heater 48 is controlled so that the temperature of the resin reel 28 becomes 60° C. The temperature of an Er doped optical fiber 42 and single-mode optical fibers 44 wound around the resin reel 28 can be controlled to a uniform temperature of 60±0.5° C. over the circumference of the resin reel 28 by the heat conduction of the metal tape 46.

The present invention is applicable similarly to a rare-earth doped optical fiber fabricated by doping an optical fiber with any one of the other rare-earth elements.

According to the present invention as described above, the stress generated in winding the Er doped optical fiber can be relieved, and the amplification characteristic can be adjusted to a target value accurately and stably. Further, a reduction in reliability due to the stress caused by thermal expansion of the reel, for example, can be prevented, and uniform temperature control can be easily performed.

Further, the resin reel can be simply formed by molding at a low cost. The spliced portion can also be wound on the resin reel with a given bend radius. Since the Er doped optical fiber is wound around the resin reel, the shape of the fiber can be deformed to allow an increase in degree of freedom of mounting to an optical amplifier module.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. A manufacturing method for a rare-earth doped optical fiber module, comprising the steps of:

setting a resin reel having elasticity on a metal reel whose diameter is changeable between a first diameter and a second diameter larger than said first diameter;

increasing the diameter of said metal reel to said second diameter to thereby increase the diameter of said resin reel;

winding a rare-earth doped optical fiber around said resin reel;

decreasing the diameter of said metal reel to said first diameter; and removing said resin reel having said rare-earth doped optical fiber from said metal reel.

2. The manufacturing method according to claim 1, further comprising the step of splicing a single-mode optical fiber to said rare-earth doped optical fiber after decreasing the diameter of said metal reel to said first diameter and before removing said resin reel from said metal reel.

3. The manufacturing method according to claim 2, further comprising the steps of:

recoating a spliced portion between said rare-earth doped optical fiber and said single-mode optical fiber; and winding said single-mode optical fiber around said resin reel.

* * * * *